United States Patent
Wang et al.

(10) Patent No.: US 11,709,914 B2
(45) Date of Patent: Jul. 25, 2023

(54) FACE RECOGNITION METHOD, TERMINAL DEVICE USING THE SAME, AND COMPUTER READABLE STORAGE MEDIUM

(71) Applicant: UBTECH ROBOTICS CORP LTD, Shenzhen (CN)

(72) Inventors: Hanliu Wang, Shenzhen (CN); Jun Cheng, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 44 days.

(21) Appl. No.: 17/510,415

(22) Filed: Oct. 26, 2021

(65) Prior Publication Data
US 2022/0198224 A1 Jun. 23, 2022

(30) Foreign Application Priority Data
Dec. 17, 2020 (CN) .......................... 202011501362.0

(51) Int. Cl.
*G06V 40/16* (2022.01)
*G06F 18/214* (2023.01)
(Continued)

(52) U.S. Cl.
CPC ........... *G06F 18/2148* (2023.01); *G06N 3/04* (2013.01); *G06V 10/141* (2022.01);
(Continued)

(58) Field of Classification Search
CPC ..... G06F 18/2148; G06F 18/214; G06N 3/04; G06N 3/045; G06N 3/08; G06N 3/084;
(Continued)

(56) References Cited

U.S. PATENT DOCUMENTS

2011/0221933 A1\* 9/2011 Yuan ...................... G06V 10/60
348/E9.053
2018/0060675 A1\* 3/2018 Ji .......................... G06V 20/56
(Continued)

FOREIGN PATENT DOCUMENTS

CN 109460729 A \* 3/2019
CN 110610117 A \* 12/2019
(Continued)

*Primary Examiner* — Carol Wang (57) ABSTRACT

A backlight face recognition method, a terminal device using the same, and a computer readable storage medium are provided. The method includes: performing a face detection on each original face image in an original face image sample set to obtain a face frame corresponding to the original face image; capturing the corresponding original face images from the original face image sample set, and obtaining a new face image containing background pixels corresponding to the captured original face images from the original face image sample set; preprocessing all the obtained new face images to obtain a backlight sample set and a normal lighting sample set; and training a convolutional neural network using the backlight sample set and the normal lighting sample set until the convolutional neural network reaches a preset stopping condition. The trained convolutional neural network will improve the accuracy of face recognition in complex background and strong light.

20 Claims, 9 Drawing Sheets

(51) Int. Cl.
    *G06V 10/141*     (2022.01)
    *G06V 10/94*     (2022.01)
    *G06V 10/24*     (2022.01)
    *G06N 3/04*     (2023.01)

(52) U.S. Cl.
    CPC ............ *G06V 10/245* (2022.01); *G06V 10/95* (2022.01); *G06V 40/166* (2022.01); *G06V 40/171* (2022.01)

(58) Field of Classification Search
    CPC .... G06V 10/141; G06V 10/245; G06V 10/95; G06V 10/454; G06V 10/60; G06V 10/82; G06V 40/166; G06V 40/171; G06V 40/164; G06V 40/169; G06V 40/161
    See application file for complete search history.

(56) References Cited

U.S. PATENT DOCUMENTS

2018/0181796 A1*   6/2018   Wang ................... G06V 10/42
2018/0276455 A1*   9/2018   An ...................... G06V 10/764

FOREIGN PATENT DOCUMENTS

| | | | | |
|---|---|---|---|---|
| CN | 111985527 A | * | 11/2020 | |
| JP | 2009089357 A | * | 4/2009 | ............ G03B 7/091 |

\* cited by examiner

FACE RECOGNITION METHOD, TERMINAL DEVICE USING THE SAME, AND COMPUTER READABLE STORAGE MEDIUM

CROSS REFERENCE TO RELATED APPLICATIONS

The present disclosure claims priority to Chinese Patent Application No. 202011501362.0, filed Dec. 17, 2020, which is hereby incorporated by reference herein as if set forth in its entirety.

BACKGROUND

1. Technical Field

The present disclosure relates to face recognition technology, and particularly to a backlight face recognition method, a terminal device using the same, and a computer readable storage medium.

2. Description of Related Art

The face recognition technology is based on human facial features. For the input face image or video stream, whether there is a face or not is determined first. If there is a face, the position and the size of each face and the location of each main facial organs are further determined, then the identity features contained in each face are extracted to compare with known faces, thereby identifying the identity for each face.

As a new identity authentication technology, the face recognition technology is widely used in terminal devices such as robots, mobile phones, personal digital assistants, and CCTV cameras. When performing face recognition, because the complex background and strong light in the environment where the face is located will affect the accuracy of face recognition, the improvement of the accuracy of face recognition in the complex background and strong light had become an urgent problem need to be solved.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, entireties, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the description and the appended claims of the present disclosure, the terms "first", "second", "third", and the like in the descriptions are only used for distinguishing, and cannot be understood as indicating or implying relative importance.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in some other embodiments", "in other embodiments" and the like that appear in different places of the specification do not mean that descripted embodiments should be referred by all other embodiments, but instead be referred by "one or more but not all other embodiments" unless otherwise specifically emphasized. The terms "including", "comprising", "having" and their variations all mean "including but not limited to" unless otherwise specifically emphasized.

The backlight face recognition method provided in the embodiments of the present disclosure may be applied to a terminal device that has a camera or can communicate with the camera, for example, a robot, an automated guided vehicle (AGV), an unmanned aerial vehicle, a mobile phone, a smart ring (e.g., a smart bracelet and a smart neck ring), a tablet computer, a laptop computer, a netbook computer, a personal digital assistant (PDA), a server, and the like, so as to accurately detect the face in the environment, especially the face in complex background or strong light. The method may be executed by a processor of the terminal device by executing a computer program with corresponding functions. The robot may be a service robot, for example, an educational robot, an entertainment robot, a logistics robot, a nanny robot, a welcome robot, and the like, while the type of the terminal device is not limited herein.

Figure 1:
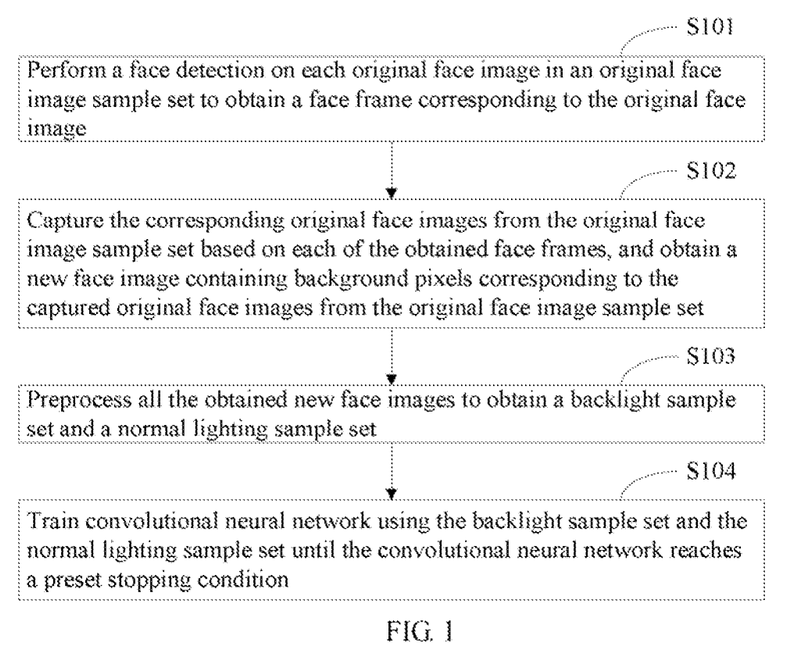
FIG. 1 is a flow chart of the first embodiment of a backlight face recognition method according to the present disclosure.

FIG. 1 is a flow chart of the first embodiment of a backlight face recognition method according to the present disclosure. A backlight face recognition method is provided. In one embodiment, the backlight face recognition method is a computer-implemented method executable for a processor, which may be applied to the above-mentioned terminal device. The method may be implemented through a backlight face recognition apparatus shown in FIG. 8 or a terminal device shown in FIG. 9. As shown in FIG. 1, the method may include the following steps.

S101: performing a face detection on each original face image in an original face image sample set to obtain a face frame corresponding to the original face image.

In one embodiment, the original face image sample set is an image set composed of original face images. The original face image is an image that contains background pixels and face pixels that is obtained by photographing a (human) face through a camera (disposed on the terminal device). The background pixels are the pixels corresponding to the background objects in the environment where the face is located in the original face image, and the face pixels are the pixels corresponding to the face in the original face image. In contrary to the background pixels, the face pixels can also be called foreground pixels.

In one embodiment, before step S101, the method may further include:

taking a plurality of original face images through the camera; and creating the original image sample set including all the original face images.

In one embodiment, a face detector called RetinaFace may be used to perform face detection on each original face image, so as to obtain a face frame and face key points corresponding to each original face image output by the face detector. There are usually five face key points namely the center of the left and right eyes, the nose, and the left and right corners of the mouth. The face frame is a rectangular frame that includes all face pixels and a few background pixels around the face pixels.

In one embodiment, step S101 may include:

performing the face detection on each original face image in the original face image sample set using the face detector to obtain a face frame corresponding to the original face image output by the face detector.

S102: capturing the corresponding original face images from the original face image sample set based on each of the obtained face frames, and obtaining a new face image containing background pixels corresponding to each of the captured original face images from the original face image sample set.

In one embodiment, since the face frame mainly contains face pixels while contains a few or even no background pixels, it is necessary to re-capture the original face image according to the face frame so as to obtain the new face image containing more background pixels.

Figure 2:
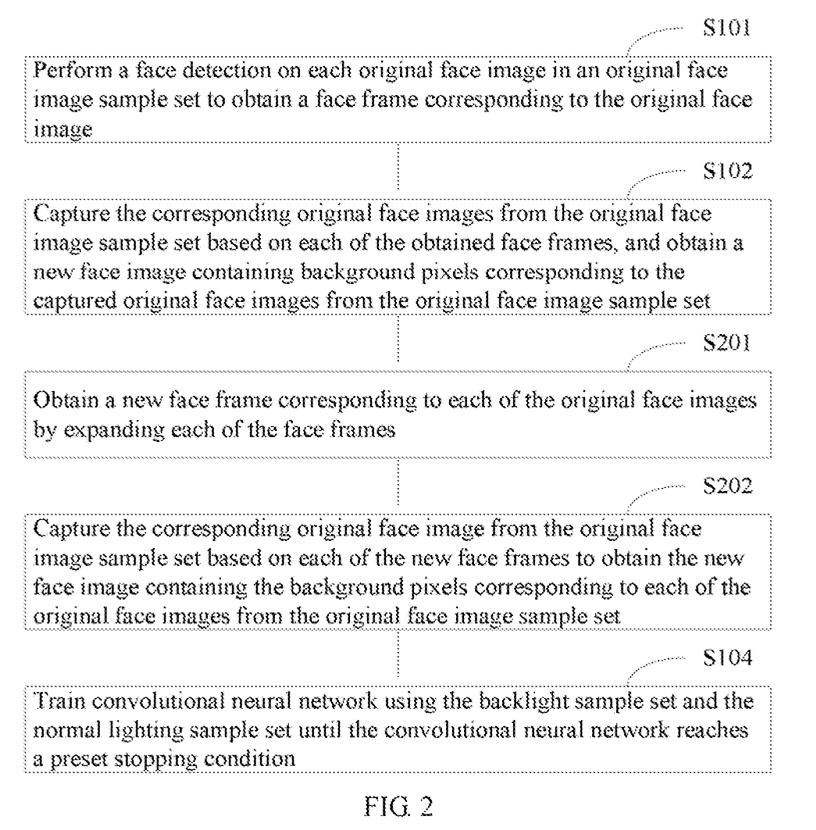
FIG. 2 is a flow chart of the second embodiment of a backlight face recognition method according to the present disclosure.

FIG. 2 is a flow chart of the second embodiment of a backlight face recognition method according to the present disclosure. As shown in FIG. 2, in one embodiment, step S102 may include the following sub-steps:

S201: obtaining a new face frame corresponding to each of the original face images by expanding each of the face frames; and S202: capturing the corresponding original face image from the original face image sample set based on each of the new face frames to obtain the new face image containing the background pixels corresponding to each of the captured original face images from the original face image sample set.

In one embodiment, after obtaining the face frame, it is expanded to obtain the new face frame, then the new face frame is used to capture the original face image so as to obtain the new face image containing face pixels and more background pixels. The original face image may be captured by cropping the area where the new face frame is in the original face image is located, where only the face pixels and background pixels in the area where the new face frame is located are retained while the background pixels outside the new face frame are deleted.

Figure 3:
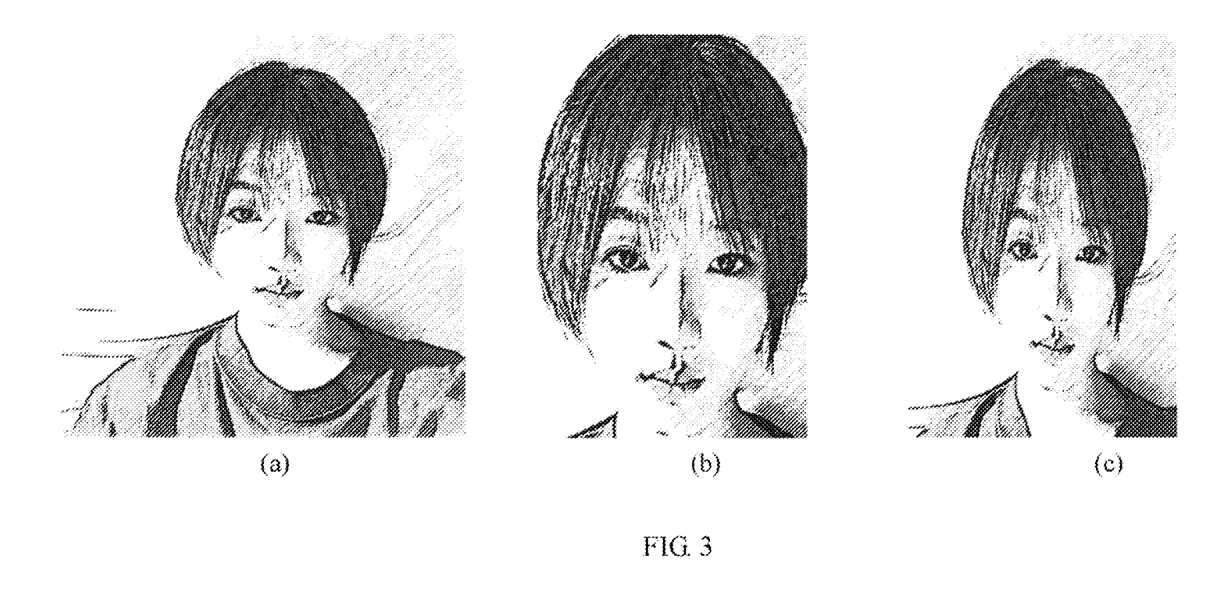
FIG. 3 is a schematic diagram of an original face image, a face frame, and a new face image according to an embodiment of the present disclosure.

FIG. 3 is a schematic diagram of an original face image, a face frame, and a new face image according to an embodiment of the present disclosure. As shown in FIG. 3, from left to right, there are the original face image (i.e., part (a)), the face frame (i.e., part (b)), and the new face image (i.e., part (c)) in order.

Figure 4:
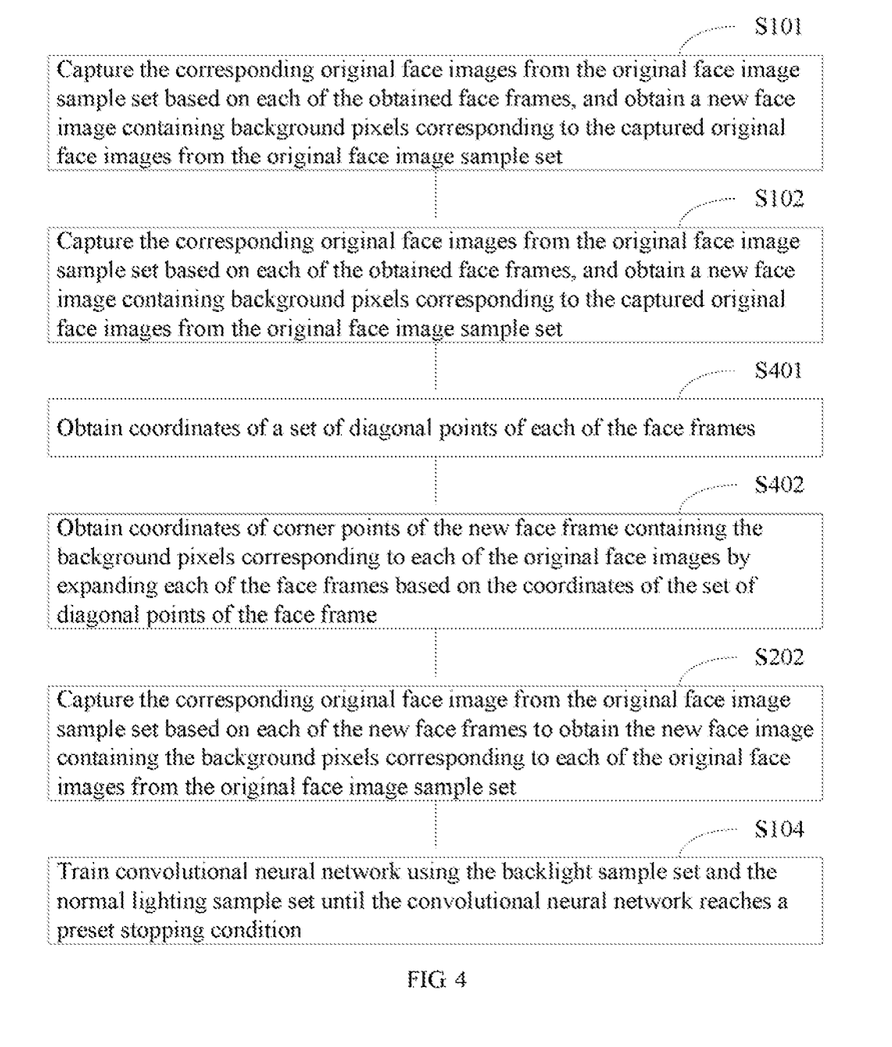
FIG. 4 is a flow chart of the third embodiment of a backlight face recognition method according to the present disclosure.

FIG. 4 is a flow chart of the third embodiment of a backlight face recognition method according to the present disclosure. As shown in FIG. 4, in one embodiment, step S201 may include the following sub-steps:

S401: obtaining coordinates of a set of diagonal points of each of the face frames.

S402: obtaining coordinates of corner points of the new face image containing the background pixels corresponding to each of the captured original face images by expanding each of the face frames based on the coordinates of the set of diagonal points of the face frame.

In one embodiment, in the case that the face frame is a rectangular frame, two of its four corner points that are on any side have the same abscissa (X-axis) or ordinate (Y-axis), and the abscissa and the ordinate of each set of diagonal points in the four corner points are different. Therefore, the coordinates of its four corner points can be obtained upon obtaining the coordinates of a set of diagonal points of the face frame. After obtaining the coordinates of any set of diagonal points of the face frame, the face frame can be expanded based on the obtained coordinates of so that the range of the pixels of the expanded new face frame is larger than the face frame and small than or equal to the original face image, that is, the minimum value of the abscissas of the four corner points of the new face frame should be smaller than the minimum value of the abscissas of the four corner points of the face frame and larger than or equal to the minimum value of the abscissas of all the pixels in the original face image, the maximum value of the abscissas of the four corner points of the new face frame should be larger than the maximum value of the abscissas of the four corner points of the face frame and smaller than or equal to the minimum value of the abscissas of all the pixels in the original face image, the minimum value of the ordinate of the four corner points of the new face frame should be smaller than the minimum value of the ordinate of the four corner points of the face frame and larger than or equal to the minimum value of the ordinate of all the pixels in the original face image, the maximum value of the ordinate of the four corner points of the new face frame should be larger than the maximum value of the ordinate of the four corner points of the face frame and smaller than or equal to the minimum value of the abscissas of all the pixels in the original face image.

In one embodiment, step S402 may include the following sub-steps:

obtaining coordinates of a center point of each of the face frames based on the coordinates of the set of diagonal points of the face frame; and obtaining the coordinates of the corner points of the new face image containing the background pixels corresponding to each of the captured original face images based on a preset expansion ratio coefficient and the coordinates of the set of diagonal points and the coordinates of the center point of each of the face frames.

In one embodiment, the new face frame may be obtained by taking the center point of the face frame as the origin to expand toward the positive and negative directions of the abscissa of the face frame and the positive and negative directions of the ordinate of the face frame, that is, taking the center point of the face frame as the origin to expand toward the periphery of the face frame. The preset expansion ratio coefficient may be set according to actual needs, which should be larger than the face frame and smaller than the original face image. The abscissa and the ordinate of the new face frame may correspond to different preset expansion ratio coefficients, that is, the expansion ratios of the abscissa and the ordinate may be different.

In one embodiment, the coordinates of the center point of each of the face frames may be calculated through equations of:

$$x_{center}=(x_2-x_1)/2; \text{ and}$$

$$y_{center}=(y_2-y_1)/2;$$

where, $x_{center}$ represents the abscissa of the center point of any of the face frames, $y_{center}$ represents the ordinate of the center point of the face frame, $x_1$ represents the abscissa of a first diagonal point in the set of diagonal points of the face frame, $x_2$ represents the abscissa of a second diagonal point in the set of diagonal points of the face frame, $y_1$ represents the ordinate of the first diagonal point in the set of diagonal points of the face frame, and $y_2$ represents the ordinate of the second diagonal point in the set of diagonal points of the face frame; and the coordinates of the corner points of the new face image containing the background pixels that corresponds to each of the captured original face images may be calculated through equations of:

$$\text{max\_long}=\max((x_2-x_i),(y_2-y_1));$$

$$x_{new1}=x_{center}-(\text{max\_long}*\alpha_1)/2;$$

$$x_{new2}=x_{center}+(\text{max\_long}*\alpha_1)/2;$$

$$y_{new1}=y_{center}-(\text{max\_long}*\alpha_2)/2; \text{ and}$$

$$y_{new2}=y_{center}+(\text{max\_long}*\alpha_2)/2;$$

where, max represents the maximum value function, $x_{new1}$ represents the abscissa of a first diagonal point in a set of diagonal points of any new face frame, $x_{new2}$ represents the abscissa of a second diagonal point in the set of diagonal points of any new face frame, $y_{new1}$ represents the ordinate of the first diagonal point in the set of diagonal points of any new face frame, $y_{new2}$ the ordinate of the second diagonal point in the set of diagonal points of any new face frame, at represents a first preset expansion ratio coefficient, and $\alpha_2$ represents a second preset expansion ratio coefficient.

In one embodiment, the first preset expansion ratio coefficient and the second preset expansion ratio coefficient may be set to be the same or different according to actual needs. In the case that the new face frame is a rectangular frame, two of its four corner points that are on any side have the same abscissa (X-axis) or ordinate (Y-axis), and the abscissa and the ordinate of each set of diagonal points in the four corner points are different. Therefore, the coordinates of its four corner points can be obtained upon obtaining the coordinates of any set of diagonal points of the new face frame.

Figure 5:
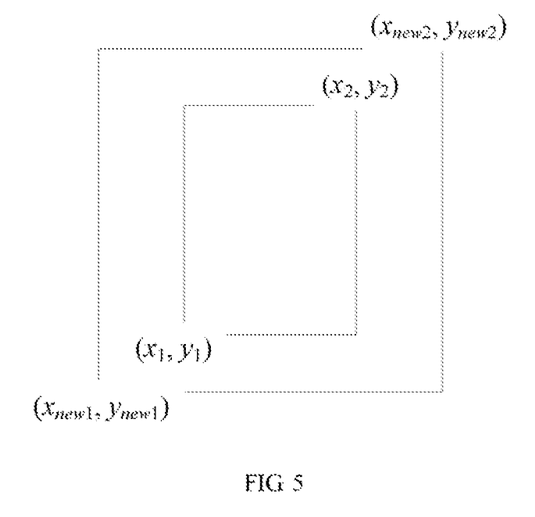
FIG. 5 is a schematic diagram of the coordinates of a face frame and a set of its diagonal points as well as the coordinates of a new face frame and a set of its diagonal points.

FIG. 5 is a schematic diagram of the coordinates of a face frame and a set of its diagonal points as well as the coordinates of a new face frame and a set of its diagonal points. Referring to FIG. 5, the coordinates of the face frame 51 and a set of its diagonal points are $(x_1, y_1)$ and $(x_2, y_2)$, respectively, and the coordinates of the face frame 52 and a set of its diagonal points are $(x_{new1}, y_{new1})$ and $(x_{new2}, y_{new2})$, respectively.

S103: preprocessing all the obtained new face images to obtain a backlight sample set and a normal lighting sample set.

In one embodiment, in order to enable the convolutional neural network to detect both the face in complex background and that in strong light, after capturing the original face image to obtain the new face image containing the background pixels, it further needs to preprocess the new face image so as to obtain the backlight sample set composed of backlight samples and the normal lighting sample set composed of normal lighting samples. In which, the backlight sample is the new face image with at least one of missing facial feature and blurred facial contour feature, and the normal lighting sample is the new face image with complete facial feature and clear facial contour feature.

In one embodiment, the convolutional neural network may be a lightweight convolutional neural network, for example, the shufflenetV2 0.5×[2] model or the shufflenetV2 0.25× model. The accuracy of the shufflenetV2 0.5×[2] model for detecting faces is 96%, where the accuracy is relatively higher and the maximum image size that can be input is 224*224. The accuracy of the shufflenetV2 0.25× model for detecting faces is 90%, where the accuracy is lower than that of the shufflenetV2 0.5×[2] model while the number of the output channels is relatively small and the calculation amount of is relatively small.

In one embodiment, before step S103, the method may further include:

reducing each of the new face images according to a preset reduction ratio.

In one embodiment, the size of each new face image may be reduced, thereby reducing the calculation amount of the convolutional neural network. The preset reduction ratio may be set according to actual needs, as long as the size of the reduced new face image is larger than or equal to the minimum image size that can be recognized by the convolutional neural network. For example, when the shufflenetV2 0.5×[2] model is used, the size of each new face image can be reduced to 128*128, that is, the preset reduction ratio is (128/224)*(128/224)=1/3, so that the calculation amount of the shufflenetV20.5×[2] model can be reduced to ⅓ of the original.

Figure 6:
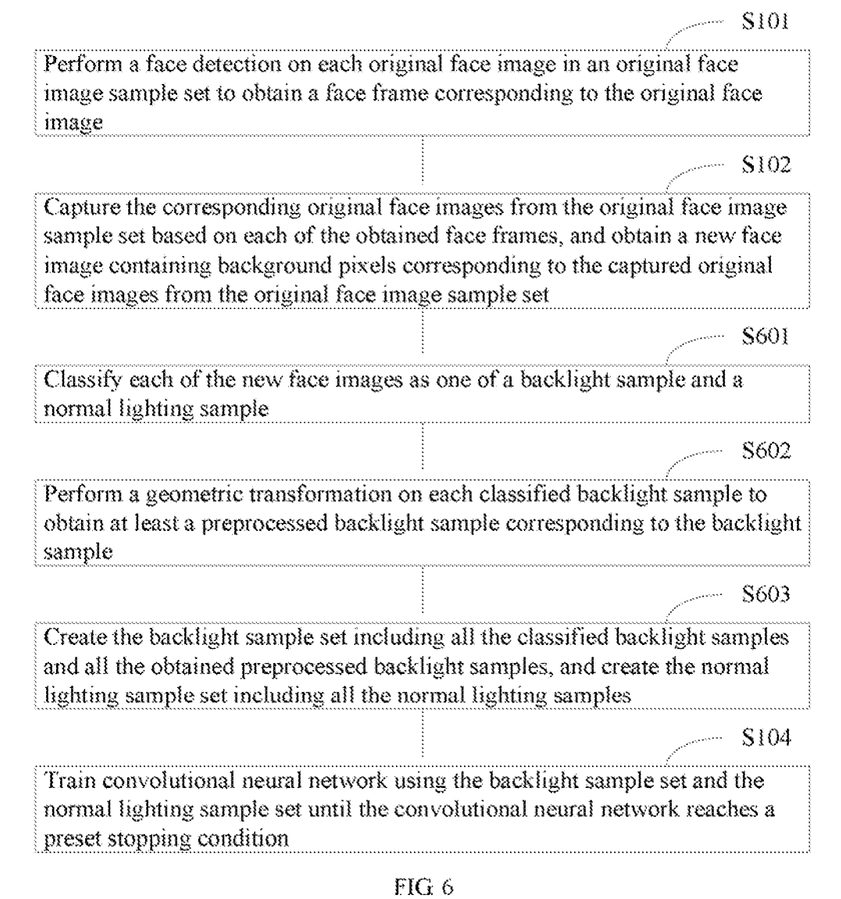
FIG. 6 is a flow chart of the fourth embodiment of a backlight face recognition method according to the present disclosure.

FIG. 6 is a flow chart of the fourth embodiment of a backlight face recognition method according to the present disclosure. As shown in FIG. 6, in one embodiment, step S103 may include the following sub-steps:

S601: classifying each of the new face images as one of a backlight sample and a normal lighting sample;

S602: performing a geometric transformation on each classified backlight sample to obtain at least a preprocessed backlight sample corresponding to the classified backlight sample; and S603: creating the backlight sample set including all the classified backlight samples and all the obtained preprocessed backlight samples, and creating the normal lighting sample set including all the normal lighting samples.

In one embodiment, each new face image is classified according to the completeness of facial features and the clarity of facial contour features in the new face image first, then the new facial images with missing facial feature or blurred facial feature contours feature is classified as the backlight sample and added to the backlight sample set and the new facial images with complete facial feature and clear facial contour feature is classified as the normal lighting sample and added to the normal lighting sample set.

In one embodiment, since the number of backlight samples is usually less than that of normal lighting samples, geometric transformation such as mirror flip, rotation, translation, zooming and the like may be performed on each backlight sample to obtain a pre-processed backlight sample corresponding to the backlight sample to add to the backlight sample set so as to enrich the backlight sample set, so that the number of samples in the backlight sample set and the normal lighting sample set can be balanced.

S104: training a convolutional neural network using the backlight sample set and the normal lighting sample set until the convolutional neural network reaches a preset stopping condition.

In one embodiment, after creating the backlight sample set and the normal lighting sample set, they can be used to train the convolutional neural network until the convolutional neural network reaches the preset stopping condition. The preset stopping condition may be set according to actual needs, which may be, for example, the accuracy of the convolutional neural network to classify backlight samples or normal lighting samples being greater than a preset accuracy threshold, the converges and loss functions of the convolutional neural network being reduced to a preset loss value, the performance of the convolutional neural network being no longer improved, and the like. The case that the performance of the convolutional neural network is no longer improved may be its accuracy of classifying backlight samples or normal lighting samples being no longer improved or the loss being no longer reduced. The preset accuracy threshold and the preset loss value may be set according to actual needs. For example, the preset accuracy threshold may be any value between 93% and 99% such as 96%.

Figure 7:
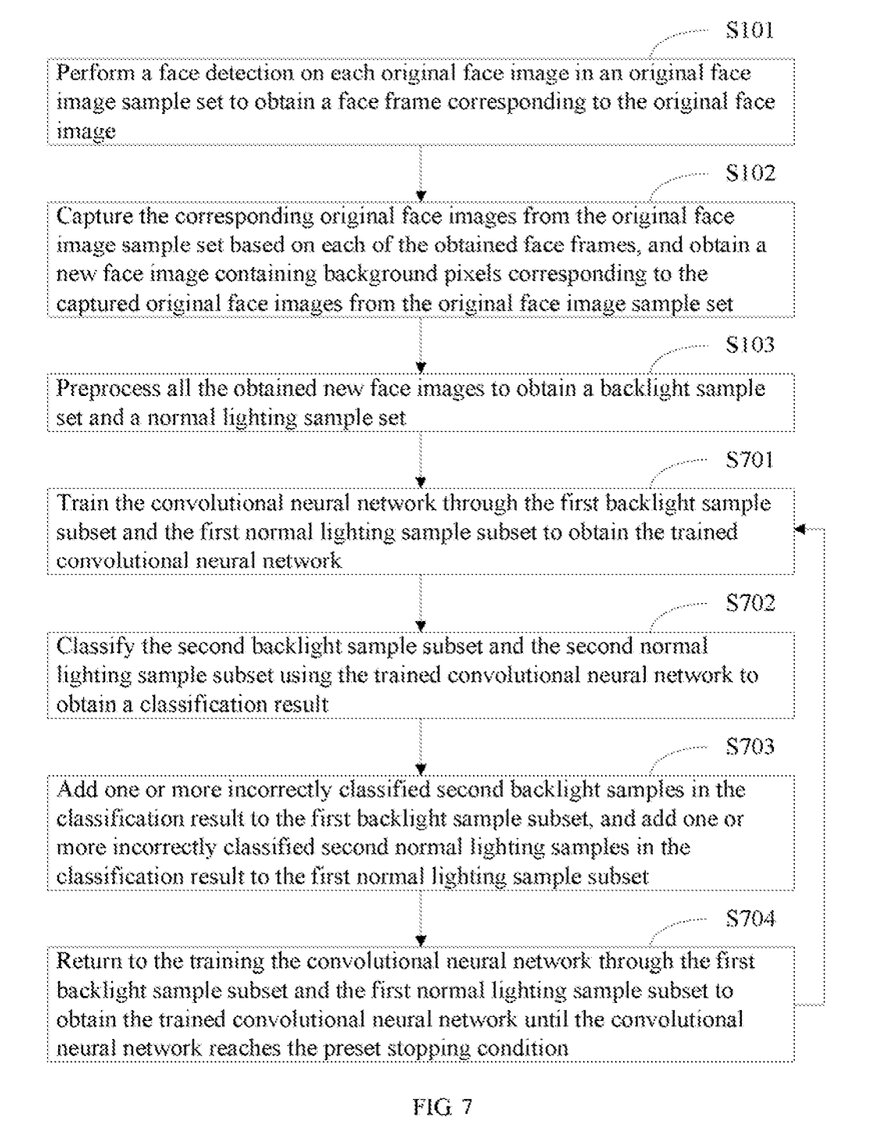
FIG. 7 is a flow chart of the fifth embodiment of a backlight face recognition method according to the present disclosure.

FIG. 7 is a flow chart of the fifth embodiment of a backlight face recognition method according to the present disclosure. As shown in FIG. 7, in one embodiment, step S104 may include the following sub-steps:

S701: training the convolutional neural network through the first backlight sample subset and the first normal lighting sample subset to obtain the trained convolutional neural network;

S702: classifying the second backlight sample subset and the second normal lighting sample subset using the trained convolutional neural network to obtain a classification result;

S703: adding one or more incorrectly classified second backlight samples in the classification result to the first backlight sample subset, and adding one or more incorrectly classified second normal lighting samples in the classification result to the first normal lighting sample subset; and S704: returning to the training the convolutional neural network through the first backlight sample subset and the first normal lighting sample subset to obtain the trained convolutional neural network until the convolutional neural network reaches the preset stopping condition.

In one embodiment, the backlight sample set and the normal lighting sample set may be respectively divided into two subsets, then the first subset may be used to train the convolutional neural network, and then the second subset may be used to test the trained convolutional neural network. The trained convolutional neural network is used to classify the samples in the second subset to obtain the classification result. Based on the classification result, the backlight samples in the classification result that are incorrectly classified as the normal lighting samples and the normal lighting samples in the classification result that are incorrectly classified as the backlight samples are added to the first subset, and the first subset is used to train the trained convolutional neural network again. The forgoing process will be performed in a loop manner until the convolutional neural network reaches the preset stopping condition.

In one embodiment, the sample set used to train the convolutional neural network may also be the backlight sample set and the normal lighting sample set. The sample set used to test the trained convolutional neural network each time to obtain the classification result may also be the new backlight sample set and the new normal lighting sample set. The new backlight sample set and the new normal lighting sample set are created using the new original faces in the same way as the backlight sample set and the normal lighting sample set.

In one embodiment, after step S104, the method may further include:

collecting face image(s) through a camera; and classifying the collected face image(s) through the trained convolutional neural network to obtain a classification result.

In one embodiment, after the convolutional neural network is trained to reach the preset stopping condition, it can be used to classify any face image. The convolutional neural network that is trained to reach the preset stopping condition can accurately distinguish the face in the backlight and the face in the normal lighting, which can improve the effect of the face recognition and the accuracy of the input of face-based identification information, thereby improving the accuracy of the face recognition of the terminal device using the backlight face recognition method so as to enhance user experience and meet user needs.

In the backlight face recognition method, the convolutional neural network is trained using the backlight sample set and the normal lighting sample set composed of the new face image containing the background pixels, which can effectively improve the accuracy of the face recognition for a terminal device that is realized based on the convolutional neural network in complex background and strong light.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 8:
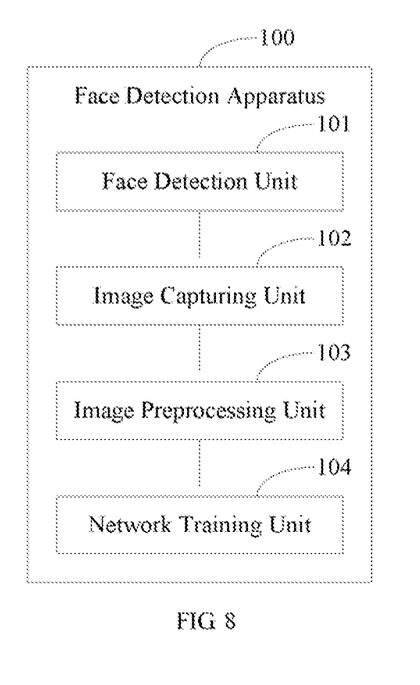
FIG. 8 is a schematic block diagram of a backlight face recognition apparatus according to an embodiment of the present disclosure.

FIG. 8 is a schematic block diagram of a face recognition apparatus according to an embodiment of the present disclosure. A face recognition apparatus 100 for performing the steps in the above-mentioned backlight face recognition method is provided. The backlight face recognition apparatus may be a virtual appliance in the above-mentioned terminal device that is executed by the processor of the terminal device, or be the terminal device itself.

As shown in FIG. 8, the face recognition apparatus 100 may include:

a face detection unit 101 configured to perform a face detection on each original face image in an original face image sample set to obtain a face frame corresponding to the original face image;

an image capturing unit 102 configured to the corresponding original face images from the original face image sample set based on each of the obtained face frames, and obtain a new face image containing background pixels corresponding to the captured original face images from the original face image sample set;

an image preprocessing unit 103 configured to preprocess all the obtained new face images to obtain a backlight sample set and a normal lighting sample set; and a network training unit 104 configured to train a convolutional neural network using the backlight sample set and the normal lighting sample set until the convolutional neural network reaches a preset stopping condition.

In one embodiment, the face recognition apparatus 100 may further include:

an image zooming unit configured to reduce each of the new face images according to a preset reduction ratio.

In one embodiment, the face recognition apparatus 100 may further include:

an image collection unit configured to collect a face image through a camera; and an image classification unit configured to classify the collected face image through the trained convolutional neural network to obtain a classification result.

In one embodiment, each unit in the face recognition apparatus 100 may be a software unit, or be implemented by logic circuits integrated in the processor, or may be implemented by a plurality of distributed processors.

Figure 9:
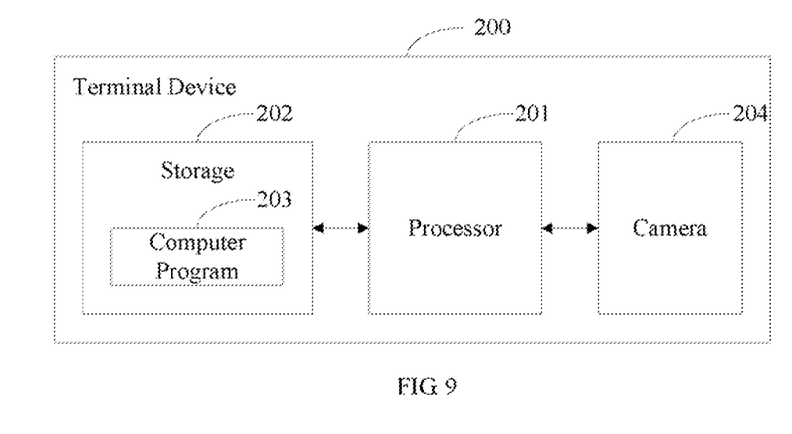
FIG. 9 is a schematic block diagram of a terminal device according to an embodiment of the present disclosure.

FIG. 9 is a schematic block diagram of a terminal device according to an embodiment of the present disclosure. As shown in FIG. 9, a terminal device 200 is provided, which includes: at least one processor 201 (only one processor is shown in FIG. 9), a storage 202, a computer program 203 stored in the storage 202 and executable on the processor 201, and a camera 204 connected to the processor 201. The processor 201 implements the steps in any of the foregoing method embodiments when executing the computer program 203.

Those skilled in the art can understand that, FIG. 9 is only an example of a terminal device, and does not form a limitation on the terminal device 200. It may include more or less components than shown in the figure, some of the components may be combined, or may include other components, for example, including input device and output devices, network access devices, or the like.

In one embodiment, the processor 201 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In one embodiment, the storage 201 may be an internal storage unit of the terminal device 200, for example, a hard disk or a memory of the terminal device 200. The storage 202 may also be an external storage device of the terminal device 200, for example, a plug-in hard disk, a smart media card (SMC), a secure digital (SD) card, flash card, and the like, which is equipped on the terminal device 200. Furthermore, the storage 202 may further include both an internal storage unit and an external storage device, of the terminal device 200. The storage 202 is configured to store the operating system, application programs, a boot loader, and the related data. The storage 202 may also be used to temporarily store the data that has been output or will be output.

It should be noted that, the information exchange and execution process between the above-mentioned apparatus/units are based on the same concept as the above-mentioned method embodiments. The specific functions and technical effects are as the above-mentioned method embodiments, and are not described herein.

Those skilled in the art may clearly understand that, for the convenience and simplicity of description, the division of the above-mentioned functional units is merely an example for illustration. In actual applications, the above-mentioned functions may be allocated to be performed by different functional units according to requirements, that is, the internal structure of the device may be divided into different functional units or modules to complete all or part of the above-mentioned functions. The functional units in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit is merely for the convenience of distinguishing each other and are not intended to limit the scope of protection of the present disclosure. For the specific operation process of the units in the above-mentioned system, reference may be made to the corresponding processes in the above-mentioned method embodiments, and are not described herein.

In the embodiments of the present disclosure, a network device is further provided, which includes at least one processor, a storage, and a computer program stored in the storage executable on the processor. The processor implements the steps in the above-mentioned method embodiments when executing the computer program.

In the embodiments of the present disclosure, a non-transitory computer-readable storage medium is further provided, which stores a computer program. When the computer program is executed by a processor, the steps in the above-mentioned method embodiments is implemented.

In the embodiments of the present disclosure, a computer program product is further provided. When the computer program product is executed on a terminal device, the steps in the above-mentioned method embodiments is implemented.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include at least any primitive or device capable of carrying the computer program codes to an apparatus/device, a recording medium, a computer memory, a read-only memory (ROM), a random access memory (RAM), electric carrier signals, and telecommunication signals and software distribution media, for example, a USB flash drive, a portable hard disk, a magnetic disk, and an optical disk, It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/device and method may be implemented in other manners. For example, the above-mentioned apparatus/device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented backlight face recognition method, comprising:
    performing a face detection on each original face image in an original face image sample set to obtain a face frame corresponding to the original face image;
    capturing the corresponding original face images from the original face image sample set based on each of the obtained face frames, and obtaining a new face image containing background pixels corresponding to each of the captured original face images from the original face image sample set;
    preprocessing all the obtained new face images to obtain a backlight sample set and a normal lighting sample set; and
    training a convolutional neural network using the backlight sample set and the normal lighting sample set until the convolutional neural network reaches a preset stopping condition.

2. The method of claim 1, wherein the capturing the corresponding original face images from the original face image sample set based on each of the obtained face frames, and obtaining the new face image containing the background pixels corresponding to each of the captured original face images from the original face image sample set comprises:
    obtaining a new face frame corresponding to each of the original face images by expanding each of the face frames; and
    capturing the corresponding original face images from the original face image sample set based on each of the new face frames to obtain the new face image containing the background pixels corresponding to each of the captured original face images from the original face image sample set.

3. The method of claim 2, wherein the obtaining the new face frame corresponding to each of the original face images by expanding each of the face frames comprises:
    obtaining coordinates of a set of diagonal points of each of the face frames; and
    obtaining coordinates of corner points of the new face image containing the background pixels corresponding to each of the captured original face images by expanding each of the face frames based on the coordinates of the set of diagonal points of the face frame.

4. The method of claim 3, wherein the obtaining the coordinates of the corner points of the new face image containing the background pixels corresponding to each of the captured original face images by expanding each of the face frames based on the coordinates of the set of diagonal points of the face frame comprises:
    obtaining coordinates of a center point of each of the face frames based on the coordinates of the set of diagonal points of the face frame; and
    obtaining the coordinates of the corner points of the new face image containing the background pixels corresponding to each of the captured original face images based on a preset expansion ratio coefficient and the coordinates of the set of diagonal points and the coordinates of the center point of each of the face frames.

5. The method of claim 4, wherein the coordinates of the center point of each of the face frames is calculated through equations of:

$$x_{center}=(x_2-x_1)/2;\text{ and}$$

$$y_{center}=(y_2-y_1)/2;$$

where, $x_{center}$ represents the abscissa of a center point of any of the face frames, $y_{center}$ represents the ordinate of the center point of the face frame, $x_1$ represents the abscissa of a first diagonal point in the set of diagonal points of the face frame, $x_2$ represents the abscissa of a second diagonal point in the set of diagonal points of the face frame, $y_1$ represents the ordinate of the first diagonal point in the set of diagonal points of the face frame, and $y_2$ represents the ordinate of the second diagonal point in the set of diagonal points of the face frame;

the coordinates of the corner points of the new face image containing the background pixels corresponding to each of the captured original face images is calculated through equations of:

$$\text{max\_long}=\max((x_2-x_i),(y_2-y_1));$$

$$x_{new1}=x_{center}-(\text{max\_long}*\alpha_1)/2;$$

$$x_{new2}=x_{center}+(\text{max\_long}*\alpha_1)/2;$$

$$y_{new1}=y_{center}-(\text{max\_long}*\alpha_2)/2;\text{ and}$$

$$y_{new2}=y_{center}+(\text{max\_long}*\alpha_2)/2;$$

where, max represents a maximum value function, $x_{new1}$ represents the abscissa of a first diagonal point in a set of diagonal points of any new face frame, $x_{new2}$ represents the abscissa of a second diagonal point in the set of diagonal points of any new face frame, $y_{new1}$ represents the ordinate of the first diagonal point in the set of diagonal points of any new face frame, $y_{new2}$ the ordinate of the second diagonal point in the set of diagonal points of any new face frame, $\alpha_1$ represents a first preset expansion ratio coefficient, and $\alpha_2$ represents a second preset expansion ratio coefficient.

6. The method of claim 1, wherein the preprocessing all the obtained new face images to obtain the backlight sample set and the normal lighting sample set comprises:
classifying each of the new face images as one of a backlight sample and a normal lighting sample; wherein the backlight sample is the new face image with at least one of missing facial feature and blurred facial contour feature, and the normal lighting sample is the new face image with complete facial feature and clear facial contour feature;
performing a geometric transformation on each classified backlight sample to obtain at least a preprocessed backlight sample corresponding to the classified backlight sample; and
creating the backlight sample set including all the classified backlight samples and all the obtained preprocessed backlight samples, and creating the normal lighting sample set including all normal lighting samples.

7. The method of claim 6, wherein before the preprocessing all the obtained new face images to obtain the backlight sample set and the normal lighting sample set, the method further comprises:
reducing each of the new face images according to a preset reduction ratio.

8. The method of claim 1, wherein the backlight sample set includes a first backlight sample subset and a second backlight sample subset, and the normal lighting sample set includes a first normal lighting sample subset and a second normal lighting sample subset;
the training the convolutional neural network using the backlight sample set and the normal lighting sample set until the convolutional neural network reaches the preset stopping condition comprises:
training the convolutional neural network through the first backlight sample subset and the first normal lighting sample subset to obtain the trained convolutional neural network;
classifying the second backlight sample subset and the second normal lighting sample subset using the trained convolutional neural network to obtain a classification result;
adding one or more incorrectly classified second backlight samples in the classification result to the first backlight sample subset, and adding one or more incorrectly classified second normal lighting samples in the classification result to the first normal lighting sample subset; and
returning to the training the convolutional neural network through the first backlight sample subset and the first normal lighting sample subset to obtain the trained convolutional neural network until the convolutional neural network reaches the preset stopping condition.

9. A terminal device, comprising:
a processor;
a memory coupled to the processor; and
one or more computer programs stored in the memory and executable on the processor;
wherein, the one or more computer programs comprise:
instructions for performing a face detection on each original face image in an original face image sample set to obtain a face frame corresponding to the original face image;
instructions for capturing the corresponding original face images from the original face image sample set based on each of the obtained face frames, and obtaining a new face image containing background pixels corresponding to each of the captured original face images from the original face image sample set;
instructions for preprocessing all the obtained new face images to obtain a backlight sample set and a normal lighting sample set; and
instructions for training a convolutional neural network using the backlight sample set and the normal lighting sample set until the convolutional neural network reaches a preset stopping condition.

10. The terminal device of claim 9, wherein the instructions for capturing the corresponding original face images from the original face image sample set based on each of the obtained face frames, and obtaining the new face image containing the background pixels corresponding to each of the captured original face images from the original face image sample set comprise:
instructions for obtaining a new face frame corresponding to each of the original face images by expanding each of the face frames; and
instructions for capturing the corresponding original face images from the original face image sample set based on each of the new face frames to obtain the new face image containing the background pixels corresponding to each of the captured original face images from the original face image sample set.

11. The terminal device of claim 10, wherein the instructions for obtaining the new face frame corresponding to each of the original face images by expanding each of the face frames comprise:
   instructions for obtaining coordinates of a set of diagonal points of each of the face frames; and
   instructions for obtaining coordinates of corner points of the new face image containing the background pixels corresponding to each of the captured original face images by expanding each of the face frames based on the coordinates of the set of diagonal points of the face frame.

12. The terminal device of claim 11, wherein the instructions for obtaining the coordinates of the corner points of the new face image containing the background pixels corresponding to each of the captured original face images by expanding each of the face frames based on the coordinates of the set of diagonal points of the face frame comprise:
   instructions for obtaining coordinates of a center point of each of the face frames based on the coordinates of the set of diagonal points of the face frame; and
   instructions for obtaining the coordinates of the corner points of the new face image containing the background pixels corresponding to each of the captured original face images based on a preset expansion ratio coefficient and the coordinates of the set of diagonal points and the coordinates of the center point of each of the face frames.

13. The terminal device of claim 12, wherein the coordinates of the center point of each of the face frames is calculated through equations of:

$$x_{center} = (x_2 - x_1)/2; \text{ and}$$

$$y_{center} = (y_2 - y_1)/2;$$

where, $x_{center}$ represents the abscissa of a center point of any of the face frames, $y_{center}$ represents the ordinate of the center point of the face frame, $x_1$ represents the abscissa of a first diagonal point in the set of diagonal points of the face frame, $x_2$ represents the abscissa of a second diagonal point in the set of diagonal points of the face frame, $y_1$ represents the ordinate of the first diagonal point in the set of diagonal points of the face frame, and $y_2$ represents the ordinate of the second diagonal point in the set of diagonal points of the face frame;

the coordinates of the corner points of the new face image containing the background pixels corresponding to each of the captured original face images is calculated through equations of:

$$\text{max\_long} = \max((x_2 - x_i), (y_2 - y_1));$$

$$x_{new1} = x_{center} - (\text{max\_long} * \alpha_1)/2;$$

$$x_{new2} = x_{center} + (\text{max\_long} * \alpha_1)/2;$$

$$y_{new1} = y_{center} - (\text{max\_long} * \alpha_2)/2; \text{ and}$$

$$y_{new2} = y_{center} + (\text{max\_long} * \alpha_2)/2;$$

where, max represents a maximum value function, $x_{new1}$ represents the abscissa of a first diagonal point in a set of diagonal points of any new face frame, $x_{new2}$ represents the abscissa of a second diagonal point in the set of diagonal points of any new face frame, $y_{new1}$ represents the ordinate of the first diagonal point in the set of diagonal points of any new face frame, $y_{new2}$ the ordinate of the second diagonal point in the set of diagonal points of any new face frame, $\alpha_1$ represents a first preset expansion ratio coefficient, and $\alpha_2$ represents a second preset expansion ratio coefficient.

14. The terminal device of claim 9, wherein the instructions for preprocessing all the obtained new face images to obtain the backlight sample set and the normal lighting sample set comprise:
   instructions for classifying each of the new face images as one of a backlight sample and a normal lighting sample; wherein the backlight sample is the new face image with at least one of missing facial feature and blurred facial contour feature, and the normal lighting sample is the new face image with complete facial feature and clear facial contour feature;
   instructions for performing a geometric transformation on each classified backlight sample to obtain at least a preprocessed backlight sample corresponding to the classified backlight sample; and
   instructions for creating the backlight sample set including all the classified backlight samples and all the obtained preprocessed backlight samples, and creating the normal lighting sample set including all normal lighting samples.

15. The terminal device of claim 14, wherein the one or more computer programs further comprise:
   instructions for reducing each of the new face images according to a preset reduction ratio.

16. The terminal device of claim 9, wherein the backlight sample set includes a first backlight sample subset and a second backlight sample subset, and the normal lighting sample set includes a first normal lighting sample subset and a second normal lighting sample subset;
   the instructions for training the convolutional neural network using the backlight sample set and the normal lighting sample set until the convolutional neural network reaches the preset stopping condition comprise:
   instructions for training the convolutional neural network through the first backlight sample subset and the first normal lighting sample subset to obtain the trained convolutional neural network;
   instructions for classifying the second backlight sample subset and the second normal lighting sample subset using the trained convolutional neural network to obtain a classification result;
   instructions for adding one or more incorrectly classified second backlight samples in the classification result to the first backlight sample subset, and adding one or more incorrectly classified second normal lighting samples in the classification result to the first normal lighting sample subset; and
   instructions for returning to the training the convolutional neural network through the first backlight sample subset and the first normal lighting sample subset to obtain the trained convolutional neural network until the convolutional neural network reaches the preset stopping condition.

17. A non-transitory computer readable storage medium for storing one or more computer programs, wherein the one or more computer programs comprise:
   instructions for performing a face detection on each original face image in an original face image sample set to obtain a face frame corresponding to the original face image;
   instructions for capturing the corresponding original face images from the original face image sample set based on each of the obtained face frames, and obtaining a new face image containing background pixels corresponding to each of the captured original face images from the original face image sample set;

instructions for preprocessing all the obtained new face images to obtain a backlight sample set and a normal lighting sample set; and instructions for training a convolutional neural network using the backlight sample set and the normal lighting sample set until the convolutional neural network reaches a preset stopping condition.

18. The non-transitory computer readable storage medium of claim 17, wherein the instructions for capturing the corresponding original face images from the original face image sample set based on each of the obtained face frames, and obtaining the new face image containing the background pixels corresponding to each of the captured original face images from the original face image sample set comprise:

instructions for obtaining a new face frame corresponding to each of the original face images by expanding each of the face frames; and instructions for capturing the corresponding original face images from the original face image sample set based on each of the new face frames to obtain the new face image containing the background pixels corresponding to each of the captured original face images from the original face image sample set.

19. The non-transitory computer readable storage medium of claim 18, wherein the instructions for obtaining the new face frame corresponding to each of the original face images by expanding each of the face frames comprise:

instructions for obtaining coordinates of a set of diagonal points of each of the face frames; and instructions for obtaining coordinates of corner points of the new face image containing the background pixels corresponding to each of the captured original face images by expanding each of the face frames based on the coordinates of the set of diagonal points of the face frame.

20. The non-transitory computer readable storage medium of claim 19, wherein the instructions for obtaining the coordinates of the corner points of the new face image containing the background pixels corresponding to each of the captured original face images by expanding each of the face frames based on the coordinates of the set of diagonal points of the face frame comprise:

instructions for obtaining coordinates of a center point of each of the face frames based on the coordinates of the set of diagonal points of the face frame; and instructions for obtaining the coordinates of the corner points of the new face image containing the background pixels corresponding to each of the captured original face images based on a preset expansion ratio coefficient and the coordinates of the set of diagonal points and the coordinates of the center point of each of the face frames.

* * * * *